Sept. 15, 1970   J. P. JACKSON   3,528,285

TORQUE-SENSITIVE MACHINES

Filed March 8, 1968

United States Patent Office 3,528,285
Patented Sept. 15, 1970

3,528,285
TORQUE-SENSITIVE MACHINES
John Peter Jackson, Netherton, England, assignor to The English Electric Company Limited, London, England, a British company
Filed Mar. 8, 1968, Ser. No. 711,570
Claims priority, application Great Britain, Mar. 8, 1967, 10,828/67
Int. Cl. G01l 3/20
U.S. Cl. 73—134                4 Claims

ABSTRACT OF THE DISCLOSURE

This invention is concerned with a torque-sensitive machine which may be in the form either of a dynamometer or of a torque-controlled hydraulic motor. The machine includes a hydraulic pump or motor which is mounted so that it is free to swing slightly about the axis of its shaft, with a resilient arrangement restraining the pump or motor against such swinging movement, and with means for indicating the torque tending to bring about such movement. The resilient restraint is imposed by the stiffness of a resilient pipe serving as the inlet or outlet pipe for the pump or motor. This pipe is preferably so arranged that it is subjected to a bending stress when the pump or motor swings about the axis of the shaft. The machine is completed by a device which is sensitive to the degree of angular movement of the pump or motor and which serves as a torque indicator.

---

This invention is concerned with torque-sensitive hydraulic machines including a hydraulic pump or motor for which an indication of the input or output torque is required. For example, a machine according to this invention may in particular be in the form of an absorbtion dynamometer used for example for testing engines or motors by absorbing the power of the engine or motor while indicating the torque transmitted; in this case the machine would include a pump which is driven in use by the engine or motor and is provided with an adjustable flow restrictor in the pump outlet to enable the torque absorbed by the pump to be varied. Alternatively this invention may be applied to motors which are required to transmit a controlled torque, for example in the coiling of sheet metals, plastics, fabrics and paper, for which the driving torque must be closely controlled.

A torque-sensitive machine according to the invention comprises a rotary hydraulic unit having a shaft; a support arrangement carrying the unit and allowing the unit freedom to swing about the axis of the shaft; means for restraining such movement; and means, sensitive to the degree of such movement, for indicating the torque tending to bring about such movement; the restraining means comprising at least one resilient fluid conduit which serves as a fluid delivery pipe defining part of a working fluid circuit for the unit, the conduit communicating between and being connected to a first point on the unit and a second point on the support arrangement, the said first and second points being closely adjacent but the length of the resilient conduit being substantially greater than the shortest distance between the said first and second points.

Preferably the conduit comprises a first pipe, a floating bridge piece, and a supplementary pipe, the first pipe being connected to the first point and communicating via the bridge piece with the supplementary pipe which is connected to the second point.

Preferably also the first and supplementary pipes are both parallel to the axis of the shaft and are closely adjacent to the exterior of the hydraulic unit.

According to a further preferred feature of the invention the torque indicating means is located closely adjacent to the said second point whereby, in use, to reduce error caused by flexure of the support arrangement.

The hydraulic unit may be such that it can operate either as a pump or as a motor. Thus the machine could be used, for example, first as a motor to run in or start an internal combustion engine and then subsequently as an absorption dynamometer to test the engine. For this purpose the unit is preferably a positive displacement pump/motor, for example a swash-plate pump/motor.

Figure 1:
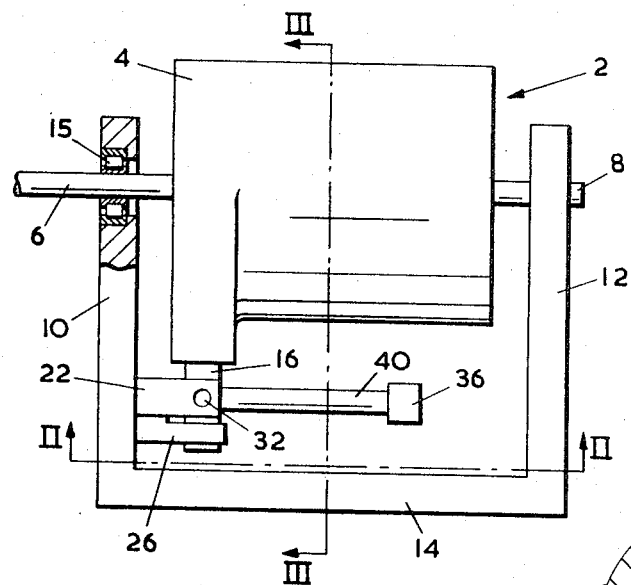
Figure 3:
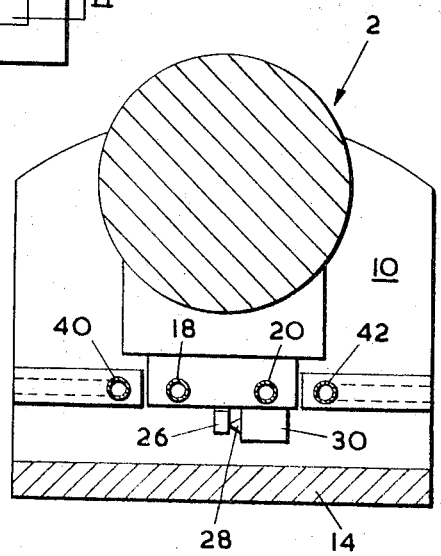
Figure 2:
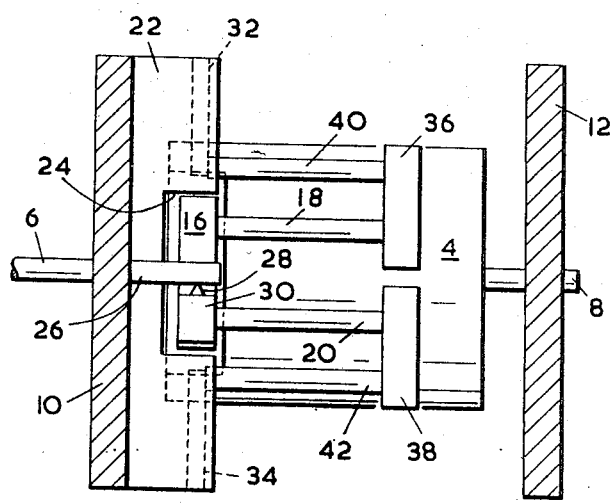

A preferred example of a dynamometer, motor or dynamometer/motor according to this invention is shown diagrammatically in the accompanying drawings. In these drawings:

FIG. 1 is a side view;
FIG. 2 is a plan view; and
FIG. 3 is a section on the line III—III in FIG. 1.

For the sake of simplicity the apparatus shown in the drawings will be referred to as a dynamometer, but it could equally well be a dynamometer/motor or a motor.

The dynamometer includes a pump 2 having a casing 4 containing a rotary part driven by an input drive shaft 6 extending into the casing from one end of the casing. At the other end of the casing there is a trunnion 8. Brackets 10 and 12 on a base 14 support the pump, and include roller bearings 15 in which the shaft 6 and trunnion 8 are mounted, so that the pump as a whole can swing about the axis of the shaft 6.

At one end of the pump there is a connector block 16 to which inlet and outlet pipes 18 and 20 are connected, these pipes being parallel to the axis of the shaft 6 and pump. A yoke 22 secured to the bracket 10 has a central recess 24 in which the block 16 of the pump lies with lateral clearance. On the yoke 22 there is a downwardly-extending vertical flange 26 which serves as a reaction member engaged by the plunger 28 of a transducer 30 mounted below the block 16 of the pump. By this arrangement, angular displacement of the pump casing about the axis of the pump results in movement of the transducer 30 towards or away from the reaction flange 26, the amount of movement being directly proportional to the torque transmitted by the shaft 6, owing to the resilient restraint imposed upon the casing by the inlet and outlet pipes 18 and 20.

As shown in FIG. 2, the pipes 18 and 20 are connected to stationary pipes 32 and 34 via floating bridge pieces 36 and 38 and via supplementary pipes 40 and 42 which are parallel to the pipes 18 and 20 and which extend back to a stationary anchorage point associated with the bracket 10. The pipes 18, 20, 40 and 42 are all resilient and may be, for example, of steel. These pipes are all resiliently flexed during use and serve in effect as a spring resisting movement of the transducer 30 towards and away from the reaction flange 26.

In use the input 32 or 34 is connected by a pipe (not shown) to a source of oil or other working fluid, and the pump output 34 or 32, as the case may be, returns the fluid to the source via an adjustable restrictor (not shown), for example a tappet valve, so that adjustment of the restrictor changes the resistance to fluid flow and therefore changes the resistance to rotation of the pump and consequently changes the value of torque absorbed by the pump.

The pipes 18 and 20 could be connected at their right-hand ends (as viewed in FIGS. 1 and 2) to stationary parts mounted on the pump-supporting structure, but in that case movement of the pump block 16 would produce a relatively complicated stressing effect on the pipes; the preferred arrangement illustrated produces a more desirable stress pattern in the pipes which is substantially a bending stress. Moreover, with the arrangement shown, all displacements are related to one end of the pump-supporting structure (i.e., the bracket 10) which can be (and should be) made especially rigid. If the right-hand ends of the pipes 18 and 20 were connected instead to stationary parts then distortion of the supporting structure as a whole could result in relative lateral movement of those stationary parts with respect to the reaction flange 26, and this would introduce an error into the values of torque indicated by the transducer.

Different torque ranges may be measured by different transducers. In other words, the transducer may be readily detachable from the block 16 so that various different transducers sensitive to different plunger displacements can be used for different ranges of torque.

In the example illustrated, the bridge pieces 36 and 38 lie horizontally and during use they are fixed slightly as beams. They could alternatively be vertical, with the pipes 40 and 42 lying respectively directly below the pipes 18 and 20; in this case the bridge pieces 36 and 38 would be subjected to torsional stresses during use.

As an alternative to the arrangement shown in the drawings, the pump may be suspended by two or more symmetrically placed pipe systems without the use of roller bearings. For example, the inlet and outlet pipe systems, each including a supplementary pipe and floating bridge piece, may lie on opposite sides of the pump, with the axes of the pipes all lying in a plane containing also the axis of the drive shaft.

Other resilient pipe arrangements may be used in place of that shown. For example, the pipes 18, 20, 40 and 42 could be arranged vertically with their axes all lying in a plane containing also the axes of the pipes 32 and 34.

The resilient restraint against angular movement of the pump can in principle be achieved by means of a single pipe serving as either the input or output to the pump, arranged either with or without the accompanying supplementary pipe and bridge piece. For example, the pump may draw its oil or other working fluid from a sump situated below the pump on the base 14, in which case the inlet pipe could simply extend downwards freely in the sump, while the outlet pipe is connected as illustrated, so as to provide the necessary resilient restraint.

As an alternative to the arrangement shown, the body of the transducer 30 may be stationary, being mounted for example on the yoke 22, while the plunger 28 engages a reaction flange on the pump connector block 16. Moreover, in order to indicate torque in either direction, the plunger may extend right through the body of the transducer so that its opposite ends can engage two suitably spaced reaction flanges; transducers of this sort are already known and may, for example, consist of three axially spaced coils surrounding the plunger, of which the centre coil may be energised by an A.C. voltage so that the position of the plunger is reflected by a difference in potential across the end coils.

The yoke 22 may be secured to the base 14, instead of of being secured to the bracket 10. In either case, it may be secured solely in its mid-region so as to allow its ends freedom for thermal expansion in opposite directions.

Instead of the left-hand end of the pump or motor being supported by a bearing carrying the shaft, the pump or motor casing may have a tubular extension surrounding the shaft and extending into the bracket 10. In this case the bearing need only allow a slight rotary movement, and it may consist of inner and outer rings connected by a number of flexible radial leaves which allow the inner ring to turn slightly (with the pump or motor casing) with respect to the fixed outer ring. There may, for example, be four evenly spaced leaves, two being vertical and two horizontal.

It will be appreciated that the pump 2 may be replaced by a hydraulic motor or pump/motor, for example of the swashplate type, so that the machine as a whole can serve as a torque-controlled motor or dynamometer/motor.

I claim:

1. A torque-sensitive machine comprising a rotary hydraulic unit having a shaft; a support arrangement carrying the unit and allowing the unit freedom to swing about the axis of the shaft; means for restraining such movement; and means, sensitive to the degree of such movement, for indicating the torque tending to bring about such movement; the restraining means comprising at least one resilient fluid conduit which serves as a fluid delivery pipe defining part of a working fluid circuit for the unit, the conduit communicating between and being connected to a first point on the unit and a second point on the support arrangement, the said first and second points being closely adjacent but the length of the resilient conduit being substantially greater than the shortest distance between the said first and second points.

2. A machine according to claim 1, wherein the conduit comprises a first pipe, a floating bridge piece, and a supplementary pipe, the first pipe being connected to the first point and communicating via the bridge piece with the supplementary pipe which is connected to the second point.

3. A machine according to claim 2, wherein the first and supplementary pipes are each parallel to the axis of the shaft and are closely adjacent to the exterior of the hydraulic unit.

4. A machine according to claim 1, wherein the torque indicating means is located closely adjacent to the said second point whereby, in use, to reduce error caused by flexure of the support arrangement.

References Cited

UNITED STATES PATENTS

| 1,944,334 | 1/1934 | Tracy | 73—134 |
| 2,706,405 | 4/1955 | Mann | 73—134 |
| 3,213,679 | 10/1965 | Lebow | 73—136 |

CHARLES A. RUEHL, Primary Examiner

U.S. Cl. X.R.

73—136